United States Patent
Solomon

[11] Patent Number: 5,811,476
[45] Date of Patent: Sep. 22, 1998

[54] AQUEOUS GEL-FILLED THERMOPLASTIC PATTERN-FORMING COMPOSITIONS AND RELATED METHODS

[76] Inventor: Paul Solomon, 288 Glencoe Rd., Glencoe, Ill. 60022

[21] Appl. No.: 726,428

[22] Filed: Oct. 4, 1996

[51] Int. Cl.$^6$ .................................................. C08K 9/00
[52] U.S. Cl. ................... 524/47; 524/52; 164/518
[58] Field of Search ............... 524/47, 52; 164/516, 164/518

[56] References Cited

U.S. PATENT DOCUMENTS

| | | | |
|---|---|---|---|
| 3,907,726 | 9/1975 | Tomiyama | 524/17 |
| 3,964,915 | 6/1976 | Doenges et al. . | |
| 4,022,727 | 5/1977 | Speyer . | |
| 4,108,931 | 8/1978 | Ogden . | |
| 4,115,488 | 9/1978 | Colpitts . | |
| 4,144,075 | 3/1979 | Koenig . | |
| 4,153,593 | 5/1979 | Zabiak et al. . | |
| 4,165,302 | 8/1979 | Armenti et al. | 524/17 |
| 4,758,613 | 7/1988 | Kawano et al. . | |
| 4,929,403 | 5/1990 | Audsley . | |
| 4,939,187 | 7/1990 | Fujita . | |
| 4,947,926 | 8/1990 | Ogino et al. . | |
| 4,996,084 | 2/1991 | Elkachouty . | |
| 5,006,583 | 4/1991 | Argueso . | |
| 5,118,727 | 6/1992 | Roberts et al. . | |
| 5,178,673 | 1/1993 | Caster et al. . | |
| 5,207,964 | 5/1993 | Mauro . | |
| 5,270,360 | 12/1993 | Solomon . | |
| 5,372,768 | 12/1994 | Solomon . | |
| 5,498,280 | 3/1996 | Fistner et al. . | |

FOREIGN PATENT DOCUMENTS 326517  2/1989  European Pat. Off. .

OTHER PUBLICATIONS

*Precision Casting Processes,* A.J. Clegg, 1991, pp. 145–175, in particular p. 151.
*How to Design and Buy Investment Castings,* Edited by Robert H. Herrmann, 1960, pp. 1–9.

*Primary Examiner*—Jeffrey T. Smith
*Attorney, Agent, or Firm*—Howell & Haferkamp, L.C.

[57] ABSTRACT

Improved thermoplastic pattern-forming compositions for investment casting processes. The compositions comprise a blend of a thermoplastic pattern-forming material and from about 5 to about 70% by weight of an aqueous gel that is substantially uniformly dispersed throughout the thermoplastic pattern-forming composition. The aqueous gel comprises water and a gellant. The thermoplastic composition may also contain another component in the form of a filler material.

35 Claims, No Drawings

AQUEOUS GEL-FILLED THERMOPLASTIC PATTERN-FORMING COMPOSITIONS AND RELATED METHODS

BACKGROUND OF THE INVENTION

The present invention relates to improved pattern-forming compositions, and more particularly to filler-containing pattern-forming thermoplastic compositions useful in investment casting, and to methods of preparing and using such improved pattern-forming compositions.

Various investment casting processes, also known as lost wax processes, have been known for centuries. Through the ages, compositions for the construction of disposable patterns used in such processes have been selected for several characteristics, including such important properties as dimensional reproducibility and the ability to produce a highly accurate surface finish in the molded disposable pattern. Because such properties are critical to many products manufactured by lost wax processes, repeated efforts have been and are being made to improve such properties of pattern-forming compositions.

The quality and properties of an investment casting depend inextricably upon the quality of the disposable pattern, which, in turn, depends upon the characteristics of the pattern-forming compositions of which the disposable patterns are molded.

Disposable thermoplastic patterns are usually formed by heating and melting a thermoplastic composition which is adapted to form a pattern, introducing the molten composition into a mold, and then cooling the composition until it solidifies to form a disposable pattern. As used herein, "melting" of a thermoplastic composition refers to melting the thermoplastic thereof such that the composition becomes fluid even though it may still contain, for example, unmelted solid particulate filler dispersed therethrough.

Thereafter, the disposable thermoplastic pattern is removed from the mold, assembled with other patterns, if necessary, and then encased in a mold forming material, usually a ceramic material, applied as an aqueous slurry in accordance with one of a variety of known methods, thereby forming a shell or cast about the disposable pattern. Often, however, because the ceramic slurry does not tend to stick to the pattern material, it is difficult to coat the pattern with the ceramic. It is believed that this problem is due to the inherent hydrophobicity of the pattern material. Therefore, a pattern material of higher hydrophilicity or that otherwise has greater adhesion to ceramic would be desirable.

Next, upon hardening of the ceramic, a major portion of the disposable pattern is removed by melting at a moderately elevated temperature by autoclaving, with substantially all of the remainder of the pattern material being removed at a substantially higher temperature by vaporization or burning or both so that, except for any ash residue from the pattern material, the inner surface of the shell or mold is clean. The shell or mold is then ready for a one-time use for forming an investment cast part. A text describing known procedures used in lost wax processes is entitled Investment Casting, H. T. Bidwell, Machinery Publishing Co., Ltd., England, 1969.

By this process, the surface characteristics of the disposable pattern and of the ceramic shell are "transferred" to the final casting. Thus, the above-discussed properties of the pattern-forming composition and any residue therefrom will affect the surface characteristics and metallurgical characteristics of a casting. Similarly, variations in expansion and contraction of compositions from which disposable patterns are formed result in shells or casts of varying dimensions, and therefore inconsistent castings.

Therefore, a satisfactory composition comprising thermoplastic pattern material should not only resist change in dimensions with changes in temperature, but also leave little or no ash residue after burning so that an accurate casting may be made. Furthermore, when the composition comprising thermoplastic pattern material is heated, it is desirable that the material not decompose before melting, and that it be capable of flowing freely when thoroughly melted. A thermoplastic composition that melts to a free-flowing state can be substantially emptied from a mold in the molten state, thereby minimizing the burden on the subsequent burning operation and forming a minimum of objectional fumes on burning.

Many thermoplastic pattern compositions have been used or suggested for use in the past. As the name "lost wax" process implies, waxes, such as natural waxes, including beeswax and the like, were originally used as thermoplastic pattern materials. As other pattern materials were sought to improve the properties of disposable patterns, other natural thermoplastic materials, such as gum damar, gum rosin, esparto waxes, and the like, mineral waxes, such as those extracted from soft coal, and the like, and petroleum waxes were adopted for use.

As a result of this search, modified waxes, such as microcrystalline waxes, were developed for use in lost wax processes. More recently, as a result of the continuing efforts of researchers to improve upon and to develop new thermoplastic materials, synthetic thermoplastics have been used as pattern materials or as thermoplastic pattern forming composition modifiers. Those efforts have also resulted in the use by some investment casters of materials other than thermoplastic pattern materials, such as mixtures of metallic salts and mercury. Moreover, pattern compositions that flow out of a mold more quickly and completely than conventional compositions have been sought.

Other efforts to increase the dimensional accuracy and stability of thermoplastic pattern-forming compositions involve the addition of solid filler materials. A "filler" is an inert additive in the sense that it does not react chemically with the thermoplastic through which it is dispersed. The filler remains a separate phase and retains its identity throughout the investment casting process. Conventionally, fillers have been solid particulates that are dispersed throughout a continuous phase of the thermoplastic material. Among the filler materials that have been included in minor quantities in thermoplastic pattern-forming compositions may be noted thermoplastic or thermosetting polystyrene powder, especially polystyrene cross-linked with divinylbenzene, and urea powder. U.S. Pat. No. 5,270,360 discloses the use of finely divided poly(methylmethacrylate) as a filler. Organic acids, such as fumaric acid, adipic acid and isophthalic acid, have also sometimes been used as fillers, usually in amounts of up to 50% by weight of the thermoplastic pattern-forming composition, and in a particle size generally from about 175 to about 250 mesh. Thus, for a typical filler, at least about 90%, preferably 100%, by weight of the particles may pass through a 100-mesh sieve and at least about 50%, preferably about 50%, by weight of the particles pass through a 200-mesh sieve.

However, conventional fillers suffer from several drawbacks. For example, such fillers commonly contain an organic component that produces an ash residue at the elevated temperatures involved in the investment casting process. Thus, as an illustration, polystyrene contains a carbonaceous benzene ring which may decompose to form carbon in addition to hydrogen gas. The ash residue, i.e., the impurity, thereby introduced into the mold limits accurate dimensional reproducibility and the ability to produce a highly accurate surface finish in the molded disposable pattern. Thus, standard fillers have been found to leave undesirably high amounts of ash residue in the mold.

Various standard fillers also involve several other problems. For example, urea tends to decompose when wax is melted, thermoplastic styrene can melt if overheated and organic acids have specific gravities and so tend to settle quickly when not sufficiently agitated. In addition, many fillers have relatively high thermal conductivity. This is desirable in that it allows faster, more even and more complete melting and cooling. However, if the pattern composition has a high rate of thermal expansion, a high thermal conductivity can lead to shell cracking due to premature expansion of the composition upon autoclaving, unless the pattern composition becomes sufficiently fluid prior to significant thermal expansion that it can flow out of the mold.

Thus, improved fillers for pattern-forming compositions are still needed that provide high thermal conductivity, but that aid the composition in flowing out of a mold quickly prior to thermal expansion that can cause shell cracking, that aid the composition in flowing out of the shell more completely, that leave less ash residue in the mold, and that result in patterns with smooth surfaces and less shrinkage. Of course, more readily available and less expensive fillers for pattern-forming materials are always being sought as well.

SUMMARY OF THE INVENTION

Briefly, therefore, the present invention is directed to a novel thermoplastic composition for casting thermoplastic patterns in investment casting. The composition comprises from about 5 to about 70% by weight aqueous gel filler dispersed through a continuous phase of thermoplastic material.

The present invention is also directed to a novel method for preparation of a thermoplastic composition for casting thermoplastic patterns in investment casting. According to the method, an aqueous gel is dispersed through a thermoplastic material to form a thermoplastic pattern-forming composition comprising particles of the aqueous gel dispersed through a continuous phase of the thermoplastic material.

The present invention is further directed to a novel method for investment casting. According to the method, a disposable pattern of a thermoplastic composition for casting thermoplastic patterns in investment casting is formed in a mold. The thermoplastic composition comprises from about 5 to about 70% by weight aqueous gel filler dispersed through a continuous phase of thermoplastic material. Next, the pattern is invested to form a cast.

Among the several advantages found to be achieved by the present invention, therefore, may be noted the provision of improved thermoplastic compositions for casting thermoplastic patterns in investment casting having higher thermal conductivities; the provision of improved thermoplastic compositions for casting thermoplastic patterns in investment casting having lower rates of thermal expansion; the provision of improved thermoplastic compositions for casting thermoplastic patterns in investment casting that adhere to wet ceramic material better than do conventional patterns; the provision of improved thermoplastic compositions for casting thermoplastic patterns in investment casting having substantially lower cost; and the provision of methods of preparing such improved thermoplastic pattern-forming compositions.

DESCRIPTION OF THE PREFERRED EMBODIMENTS

In accordance with the present invention, it has been discovered that water in the form of an aqueous gel can be dispersed through a pattern-forming thermoplastic material as a filler. Surprisingly, the gel can be incorporated into the material even at levels as high as about 70% by weight of the composition and solid patterns of water concentrations as high as 60% by weight can be formed. It has been found that the aqueous gel can be produced such that it provides a low ash filler having a low coefficient of thermal expansion and a high coefficient of thermal conductivity. Also, the patterns in which the gel has been incorporated have been found to fluidize so readily and to such low viscosity that they flow out of a mold quickly prior to thermal expansion that can cause shell cracking. Moreover, surprisingly, the patterns formed with the gel as a filler have been found to adhere well to the ceramic slurry, presumably due to the increased hydrophilicity of such patterns, thereby to easier and more thorough encasement in the ceramic. And despite such improved adhesion of the ceramic slurry to the solid pattern, once the ceramic hardens and the pattern composition is heated, the pattern composition flows out of the shell more completely, that leave less ash and other residue in the mold, resulting in patterns with smooth surfaces and less shrinkage. Further, of course, water is more readily available and less expensive than just about any potential filler that can be imagined. Not only that, but gellants that have been found to be useful in making the gel are extremely common and inexpensive as well.

In general, the thermoplastic compositions of this invention comprise a continuous phase of a thermoplastic material through which is dispersed a discontinuous phase of aqueous gel. The thermoplastic material may be any of the standard pattern-forming thermoplastic materials. Those of ordinary skill in the investment casting industry will readily recognize suitable materials. Generally, such materials are solids (although amorphous) at room temperature, but become free-flowing liquids when heated to a temperature between about 50° to about 95° C.

Thus, the terms "organic thermoplastic pattern materials", or simply "pattern materials" or "thermoplastic materials", as used herein refer to natural or synthetic remeltable compositions that comprise a thermoplastic such as wax, any of various thermoplastic polymers, any of various thermoplastic resins or a combination thereof. As noted, such compositions will be readily apparent to those of ordinary skill in the art, and organic thermoplastic materials useful in forming conventional thermoplastic patterns by conventional investment casting techniques are suitable for use in forming the thermoplastic patterns of this invention.

Accordingly, the thermoplastic materials of the present invention may comprise such conventional thermoplastics as waxes, including natural waxes such as beeswax, other natural thermoplastics, including gum damar, gum rosin, esparto waxes and the like, mineral waxes and petroleum waxes, modified waxes such as microcrystalline waxes, and synthetic thermoplastics.

Preferred thermoplastics useful in this invention include, but are not limited to, wax, stearic acid and natural and synthetic thermoplastic resins such as rosin and polyethylene. Any of a wide variety of waxes, including any of the waxes conventionally used in commercial thermoplastic pattern-forming compositions, such as paraffin, carnauba wax and microcrystalline wax, may be incorporated in the thermoplastic pattern material.

In addition to the thermoplastic, the thermoplastic material of this invention also, as with prior art compositions, typically may comprise various other polymers and resins. Thus, for example and not by way of limitation, typically such thermoplastic materials have comprised about 25% by weight wax and 75% by weight other polymers and resins.

Because a water composition is incorporated as a filler into the thermoplastic material in this invention, the material should melt at a temperature below the boiling point of the water. Although a boiling point elevator could be added to the water, it is preferred that the thermoplastic material melt at a temperature below 100° C., such as in the range of from about 50° C. to about 95° C. Again, as used herein, the term "melt" as applied to the thermoplastic material or thermoplastic composition refers to melting of thermoplastic therein sufficiently that the material or composition becomes fluid, and does not require that each constituent thereof, such as particulate solid filler, become a liquid.

As noted above, the thermoplastic pattern-forming compositions of the present invention also include an aqueous gel filler dispersed through the continuous phase. The aqueous gel comprises water and a gellant, preferably in the form of a substantially homogenous mixture. Although any type of water may be used in the present invention, including, but not limited to, tap water, it is preferred that the water utilized be either de-ionized or distilled or mixtures thereof. While any of these types of water may be used, selection should take into consideration the preference for those types that will minimize the amount of ash content in the thermoplastic pattern-forming composition. In addition, any of various additives may be incorporated into the water, if desired. For example, surfactants, water foam agents, bactericides, fungicides and the like, may be added to the water to prevent foaming upon agitation, bacteria and mold growth, etc.

The gellant of the present invention is any agent that in combination with water forms a gel. Suitable compositions will be readily apparent to those of ordinary skill in the art of gels. For the present application, the gellant may be any organic or inorganic material capable of absorbing water to form a gel, ordinarily a colloidal dispersion, of at least temporary stability. That is, the gel must not break significantly for at least the length of time from formation until its use in the casting process has ended, and under the conditions it encounters during that time. Thus, stability for at least several hours under such conditions is preferred, with greater stability—even permanent stability—being most desirable. Notably, such stability requires that the gellant as well as the resulting gel be thermally stable at the temperatures to which the pattern material will be exposed (e.g., about 50° to about 95° C.) so that they do not break down when heated to the temperatures involved in melting the pattern material. And, of course, gellants useful in the present invention are those which will not contribute substantially to the ash content of the thermoplastic pattern-forming compositions. Moreover, the gel should be able to support a static shear stress such as would be encountered in particulating and homogenizing the gel into the thermoplastic material as will be discussed below without undergoing permanent deformation.

In view of such considerations, it is believed that certain organic gellants are particularly well suited for use in the present invention, although certain inorganic and metal-organic gellants may be useful in under certain circumstances. Illustrative of organic gellants believed suitable are polysaccharides derived from tree exudations, plant seeds, seaweeds or vegetables, gums, water soluble cellulose derivatives, starches and mixtures thereof are especially suitable for use in the present invention. Preferred cellulose derivatives include, but are not limited to, methylcellulose, hydroxymethylcellulose and carboxymethylcellulose. Preferred starches are natural carbohydrate compounds of the empirical formula $(C_6H_{10}O_5)_n$ and may be derived from any suitable plant source, including corn, potato, wheat, rice and cassava. Most preferably, the gellant is corn starch.

Inorganic gellants or metal-organic gellants may be useful, but their use should be limited in use to applications in which their contribution to the ash residue of the thermoplastic pattern-forming composition can be tolerated. The gellants identified herein are merely representative exemplifications and the gellant used can be selected from gellants meeting the criteria discussed above.

The aqueous gel may be prepared by standard techniques, typically by simply mixing the gellant with water and stirring. It is desirable that the gellant be substantially homogeneously or colloidally dispersed throughout the aqueous gel. Therefore, the aqueous gel mixture may be constantly stirred during formation by any one of the various methods of stirring which are well known in the art. Constant stirring is typically desirable during gel formation, with the application of heat also being necessary for some gellants. Once the gel is formed, it has been found to be irreversible. Generally the gellant makes up from about 1 to about 30% by weight, preferably about 4 to about 20% by weight, with the bulk of the remainder—if not the entirety of the remainder—being water.

The pattern material then is prepared by dispersing the aqueous gel substantially uniformly throughout the thermoplastic material. The aqueous gel is dispersed throughout the thermoplastic material by heating the thermoplastic composition to form a melt and blending the aqueous gel into the melt as follows. The aqueous gel may be prepared in one vessel, while the thermoplastic material may be prepared in a separate vessel. The pattern material is heated until it reaches its free-flowing temperature. The heating of the material is continued to maintain it as a free-flowing thermoplastic material and the free-flowing material is constantly stirred by any of the various methods of stirring which are well known in the art. The aqueous gel is then combined with the free-flowing thermoplastic material by means of a blender or homogenizer, such as a homogenizer available from Sonic Corp. of Stratford, Conn. under the trade designation SONOLATOR, to form the thermoplastic pattern-forming composition as a two-phase material of finely divided particles of the gel throughout the melt. It has been found that once the gel has been broken up into particles and the particles of gel become coated or surrounded by the thermoplastic composition, the particles tend not to coalesce or agglomerate and the gel remains well dispersed, generally uniformly dispersed, throughout the continuous phase in the form of finely divided, discrete particles. Upon cooling of the material thus formed, the particles of gel remain discrete and dispersed through the continuous phase.

If desired, one or more additional fillers may be incorporated into the composition as well. Such fillers may be any known filler as used in conventional pattern-forming compositions. For example, filler materials that may be included in the thermoplastic pattern-forming composition of this invention include thermoplastic or thermosetting polystyrene powder, especially polystyrene cross-linked with divinylbenzene, and particulate poly(methylmethacrylate). Organic acids, such as fumaric acid, adipic acid and isophthalic acid, have also might be useful as fillers. Of course, however, the additional filler or fillers should be inert with respect to the aqueous gel in the thermoplastic composition; that is, it should not break the gel or react with gel components to form undesirable products.

It is preferred that any fillers of the present invention be generally free of inorganic impurities which may be left behind after burning and which could adversely affect the surface of a ceramic mold and metallurgical properties of the finished casting formed in the ceramic mold. Furthermore, suitable fillers neither tend to change the physical properties of the thermoplastic composition during prolonged storage or use, nor tend to leave a significant amount of ash residue in the mold.

The additional filler or fillers may be blended into the thermoplastic material by standard techniques. It may be dispersed through the continuous thermoplastic phase only, through the gel only or through both. For example, the additional filler or fillers may be added to the free-flowing material while the material is being stirred and prior to the blending of the gel into the material. Or, if the gel can maintain the particles of the additional filler(s) suspended therein, the additional filler(s) can be blended into the gel. Or, the additional filler(s) can be blended into both the pattern material and gel. Or, the gel and other filler(s) can be blended into the thermoplastic material simultaneously. Other techniques may be employed as desired. Blending techniques will be readily apparent to those of ordinary skill in the art.

Upon cooling, the thermoplastic pattern-forming compositions of the present invention solidify in a stable, solid state. By use of the term "stable", it is meant that at the temperature of concern, the composition does not melt or decompose and discrete particles of the composition distributed throughout the thermoplastic retain their particulate, discrete and "solid" nature if a solid filler material, and the aqueous gel continues to be dispersed throughout the thermoplastic and retain its gelatinous texture and composition. Consequently, the aqueous gel, and any other desired filler material added, are substantially uniformly dispersed throughout the thermoplastic pattern-forming compositions of the present invention.

The resulting thermoplastic pattern-forming composition therefore comprises about 5 to about 70% by weight, more preferably from about 15 to about 65% by weight, most preferably from about 20 to about 60% by weight, of the aqueous gel. It has been found that be this technique, the composition may comprise, for example, up to about 60% by weight water. Thus, preferred compositions may comprise from about 5% by weight to about 60% by weight, preferably about 10% by weight to about 60% by weight, more preferably about 15% by weight to about 60% by weight, even more preferably about 15% by weight to about 50% by weight, such as about 15% to about 40% by weight, water.

These thermoplastic compositions have been found to demonstrate substantially higher thermal conductivities than do prior art thermoplastic compositions, which do not contain the aqueous gel. It is believed that this is due to the fact that the thermal conductivity of water is much higher than that of the organic components of the composition and of the fillers typically used in conventional formulations. Thus, the thermoplastic compositions of the present invention are more rapidly heated and cooled than conventional thermoplastic pattern-forming compositions that do not contain the aqueous gel. As a result, when the pattern compositions of this invention is introduced in molten form into a mold which is at a lower temperature than the molten composition, the molten composition is cooled by the mold more quickly than are compositions of lower thermal conductivity and so can be removed from the mold sooner than would such low thermal conductivity compositions. Moreover, such higher thermal conductivity permits that pattern to melt and run out of the ceramic shell faster.

The thermoplastic compositions of the present invention also have certain characteristics that impart to patterns made therefrom several highly desirable characteristics, such as superior dimensional reproducibility and highly accurate surface finishes. Such desirable benefits are believed to be due in part to the relatively low rates of thermal expansion associated with the aqueous gel-containing thermoplastic compositions having. Because water has such a low rate of thermal expansion, it reduces the overall rate of thermal expansion of the thermoplastic composition in which it is incorporated. For example, a typical thermoplastic pattern-forming material containing 55% by weight of a terpene polymer, 5% by weight of a synthetic paraffin mineral wax (200° C. m.p.), 20% by weight of paraffin (59° to 60° C. m.p.), 10% by weight of carnauba wax and 10% by weight of microcrystalline wax (175° to 180° C. m.p.) expands at an average rate of about 0.16% per degree Celsius in the temperature range between about 24° and about 69° C. Water, however, expands at an average rate of about 0.045% per degree Celsius in the same temperature range. Thus, if an aqueous gel is incorporated into the thermoplastic pattern-forming composition, the resulting thermal expansion rate between these two values, and lower than that of the thermoplastic pattern-forming composition without the gel.

Moreover, the water-containing composition fluidizes rapidly compared to many prior art compositions, and once it fluidizes it is less viscous than such prior art compositions. Thus, the present compositions can fluidize and escape through the sprue of the shell prior to undue expansion of the composition, thereby reducing the risk of shell cracking. In addition, the composition has been found to flow out of ceramic molds more readily and completely than do many conventional disposable pattern materials.

Another characteristic of the gel-containing pattern composition of this invention that impart highly desirable characteristics to patterns made therefrom is hydrophilicity, or enhanced wettability, relative to conventional thermoplastic pattern-forming compositions. Conventional thermoplastic pattern-forming compositions are relatively hydrophobic and patterns made therefrom feel waxy to the touch. A drop of water placed on such patterns form a high, substantially spherical bead. By contrast, patterns formed from the compositions of this invention feels significantly less waxy to the touch and a drop of water placed thereon forms a much flatter bead. Thus, compositions of enhanced wettability may be formed according to the present invention that provide additional advantages when an aqueous slurry of shell- or mold-forming material is applied to the outside of a pattern. Whereas the water resistance of conventional pattern compositions make them difficult to coat because the ceramic slurry resists sticking to the pattern composition, pattern compositions can be formulated according to the present invention that have greater adhesion to ceramic. This not only makes coating easier, but permits a better coating to be formed, resulting in a more dimensionally accurate shell or mold.

And, although the solid composition demonstrates greater adhesiveness to the ceramic slurry, once the slurry hardens to form a shell and the composition is melted for removal from the shell, the thermoplastic compositions of the present invention do not tend to adhere to the inner surface of the ceramic shell, but to flow out readily with little if any agitation. Moreover, the compositions has been found not to degrade the fidelity of the surface or to form nonmetallic inclusions in the finished castings.

Furthermore, by substituting ashless water for conventional filler, significantly less ash residue is associated with disposable patterns formed of thermoplastic compositions of the present invention than is associated with patterns formed of conventional organic thermoplastic compositions. Although all organic thermoplastic compositions contain limited amounts of ash due to organic impurities, it is relatively easy to remove a substantial amount of these ash-forming impurities by adding the aqueous gel of the present invention to thermoplastic pattern-forming compositions. It has also been found that the amount of ash may be further reduced by utilizing water from de-ionization or distillation in the preparation of the aqueous gel.

Furthermore, because of the use of water and a gellant such as corn starch place of conventional fillers, the composition of this invention in the present invention may be produced from lower cost and more readily available ingredients.

The thermoplastic pattern compositions of this invention may be employed in the same manner as conventional pattern compositions in the investment casting process. In short, a pattern of the thermoplastic composition of this invention is formed in a mold and the pattern is invested to form a cast.

When used as investment casting compositions, the thermoplastic pattern-forming compositions of the present invention may be heated to free-flowing temperatures and maintained in the molten state in a reservoir for transfer into molds. In the molten or free-flowing state, the components of the thermoplastic pattern-forming compositions remain substantially uniformly dispersed throughout for periods long enough to permit molding operations to be completed. However, stirring may be used, if desired, to assure substantially uniform dispersion or to redisperse the components if settling has occurred in the molten compositions during storage.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples, all percentages are given on a weight basis unless otherwise indicated.

EXAMPLE 1

A thermoplastic material was produced by melting, mixing and homogeneously dispersing the following at about 150° C.:

| Ingredients | Parts by Weight |
| --- | --- |
| Terpene Polymer (115° C. m.p.) | 55 |
| Carnauba Wax | 10 |
| Paraffin Wax (59°–60° C. m.p.) | 20 |
| Microcrystalline Wax (77°–79° C. m.p.) | 10 |
| Synthetic Paraffinic Mineral Wax | 5 |

EXAMPLE 2

A thermoplastic material was produced by melting, mixing and homogeneously dispersing the following at about 150° C.:

| Ingredient | Parts by Weight |
| --- | --- |
| Paraffin Wax (59°–60° C. m.p.) | 4 |
| Beeswax | 10 |
| Gum Damar | 7 |
| Carnauba Wax | 20 |
| Terpene Polymer (115° C. m.p.) | 49 |
| Low Molecular Weight Polyethylene | 10 |

EXAMPLE 3

An aqueous gel was made by mixing 10 parts cornstarch and 90 parts hot distilled water. By use of a Sonolator™ homogenizer, the aqueous gel was blended at a temperature of 80°–85° C. with the thermoplastic material of Example 1 to form a thermoplastic pattern-forming composition comprising 20 parts aqueous gel and 80 parts thermoplastic material.

EXAMPLE 4

An aqueous gel was made by mixing 10 parts cornstarch and 90 parts hot distilled water. By use of a Sonolator™ homogenizer, the aqueous gel was blended at a temperature of 80°–85° C. with the thermoplastic material of Example 1 to form a thermoplastic pattern-forming composition comprising 40 parts aqueous gel and 60 parts thermoplastic material.

EXAMPLE 5

An aqueous gel was made by mixing 10 parts cornstarch and 90 parts hot distilled water. By use of a Sonolator™ homogenizer, the aqueous gel was blended at a temperature of 80°–85° C. with the thermoplastic material of Example 1 to form a thermoplastic pattern-forming composition comprising 50 parts aqueous gel and 50 parts thermoplastic material.

EXAMPLE 6

An aqueous gel was made by mixing 15 parts cornstarch and 85 parts hot distilled water. By use of a Sonolator™ homogenizer, the aqueous gel was blended at a temperature of 80°–85° C. with the thermoplastic material of Example 2 to form a thermoplastic pattern-forming composition comprising 20 parts aqueous gel and 80 parts thermoplastic material.

EXAMPLE 7

An aqueous gel was made by mixing 15 parts cornstarch and 85 parts hot distilled water. By use of a Sonolator™ homogenizer, the aqueous gel was blended at a temperature of 80°–85° C. with the thermoplastic material of Example 2 to form a thermoplastic pattern-forming composition comprising 40 parts aqueous gel and 60 parts thermoplastic material.

EXAMPLE 8

An aqueous gel was made by mixing 15 parts cornstarch and 85 parts hot distilled water. By use of a Sonolator™ homogenizer, the aqueous gel was blended at a temperature of 80°–85° C. with the thermoplastic material of Example 2 to form a thermoplastic pattern-forming composition comprising 50 parts aqueous gel and 50 parts thermoplastic material.

EXAMPLE 9

The compositions of Examples 3 through 8 were injected into molds and produced patterns having highly accurate surface finish characteristics and excellent flow properties. Furthermore, the thermoplastic pattern-forming compositions of Examples 3 through 8 could be handled in a normal fashion without fear of the aqueous gel breaking down so long as the temperature of the molten composition did not exceed the boiling point of the water.

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A thermoplastic composition for casting thermoplastic patterns in investment casting, comprising from about 5 to about 70% by weight aqueous gel filler dispersed through a continuous phase of thermoplastic material.

2. A composition as set forth in claim 1 wherein the thermoplastic material melts at a temperature of from about 50° C. to about 95° C.

3. A composition as set forth in claim 2 wherein the aqueous gel filler is in the form of discrete particles of aqueous gel dispersed through the continuous phase.

4. A composition as set forth in claim 2 wherein the composition comprises from about 15 to about 65% by weight of the aqueous gel filler.

5. A composition as set forth in claim 4 wherein the composition comprises from about 20 to about 60% by weight of the aqueous gel filler.

6. A composition as set forth in claim 3 wherein the composition comprises from about 15 to about 65% by weight of the aqueous gel filler.

7. A composition as set forth in claim 6 wherein the composition comprises from about 20 to about 60% by weight of the aqueous gel filler.

8. A composition as set forth in claim 2 wherein the aqueous gel filler comprises water and a gellant.

9. A composition as set forth in claim 8 wherein the gellant makes up from about 1 to about 30% by weight of the aqueous gel.

10. A composition as set forth in claim 9 wherein the gellant makes up from about 4 to about 20% by weight of the aqueous gel.

11. A composition as set forth in claim 8 wherein the gellant comprises starch.

12. A composition as set forth in claim 11 wherein the gellant is selected from the group consisting of corn starch, potato starch, wheat starch, rice starch, cassava starch and mixtures thereof.

13. A composition as set forth in claim 12 wherein the gellant is corn starch.

14. A composition as set forth in claim 2, further comprising discrete particles of solid filler material dispersed through the continuous phase.

15. A composition as set forth in claim 14 wherein the solid filler material is a particulate thermoset.

16. A composition as set forth in claim 15 wherein the solid filler material is particulate polystyrene.

17. A composition as set forth in claim 8 wherein the aqueous gel further comprise discrete particles of solid filler material.

18. A method of preparation of a thermoplastic pattern-forming composition, comprising dispersing an aqueous gel through a thermoplastic material containing a thermoplastic to form a thermoplastic pattern-forming composition comprising particles of the aqueous gel dispersed through a continuous phase of the thermoplastic material.

19. The method of preparing a composition as set forth in claim 18 wherein the thermoplastic melts from about 50° to about 95° C.

20. The method of preparing a composition as set forth in claim 19 wherein the aqueous gel is dispersed through the thermoplastic material by melting the thermoplastic so that the thermoplastic material is fluid and blending the aqueous gel with the fluid thermoplastic material.

21. The method of preparing a composition as set forth in claim 19 wherein the thermoplastic material further comprises a particulate solid filler dispersed therethrough.

22. The method of preparing a composition as set forth in claim 19 wherein the aqueous gel comprises water and a gellant.

23. A composition as set forth in claim 22 wherein the gellant makes up from about 1 to about 30% by weight of the aqueous gel.

24. A composition as set forth in claim 23 wherein the gellant makes up from about 4 to about 20% by weight of the aqueous gel.

25. A composition as set forth in claim 24 wherein the gellant is starch.

26. A composition as set forth in claim 24 wherein the gellant is selected from the group consisting of corn starch, potato starch, wheat starch, rice starch, cassava starch and mixtures thereof.

27. A composition as set forth in claim 25 wherein the gellant is corn starch.

28. A method for investment casting comprising:

forming in a mold a disposable pattern of a thermoplastic composition for casting thermoplastic patterns in investment casting, the thermoplastic composition comprising from about 5 to about 70% by weight aqueous gel filler dispersed through a continuous phase of thermoplastic material; and investing the pattern to form a cast.

29. A composition as set forth in claim 1 wherein the aqueous gel filler comprises from about 70% by weight to about 99% by weight water.

30. A composition as set forth in claim 1 wherein the composition comprises from about 5% by weight to about 60% by weight water.

31. A composition as set forth in claim 30 wherein the composition comprises from about 15% by weight to about 40% by weight water.

32. A method as set forth in claim 20 wherein the blending is carried out by means of a homogenizer to disperse finely divided particles of the aqueous gel through the fluid pattern-forming material, thereby to produce a thermoplastic pattern-forming material suitable for use as a pattern material in vestment casting.

33. A method as set forth in claim 28 wherein the aqueous gel filler comprises from about 70% by weight to about 99% by weight water.

34. A method as set forth in claim 28 wherein the thermoplastic composition comprises from about 5% by weight to about 60% by weight water.

35. A thermoplastic composition suitable for use as a pattern material in investment casting, comprising a thermoplastic and from about 15% by weight to about 40% by weight water dispersed therethrough.

* * * * *

UNITED STATES PATENT AND TRADEMARK OFFICE
CERTIFICATE OF CORRECTION

PATENT NO. : 5,811,476
DATED : 09/22/98
INVENTOR(S) : Paul Solomon

It is certified that error appears in the above-indentified patent and that said Letters Patent is hereby corrected as shown below:

Column 12, Line 17 - Replace the word "composition" with -- method --.

Column 12, Line 20 - Replace the word "composition" with -- method --.

Column 12, Line 23 - Replace the word "composition" with -- method --.

Column 12, Line 25 - Replace the word "composition" with -- method --.

Column 12, Line 29 - Replace the word "composition" with -- method --.

Signed and Sealed this

Twenty-third Day of November, 1999

Attest:

Q. TODD DICKINSON

*Attesting Officer*     *Acting Commissioner of Patents and Trademarks*